May 17, 1955  E. H. HEINEMANN ET AL  2,708,555
INERTIA REEL
Filed June 30, 1952  2 Sheets-Sheet 2

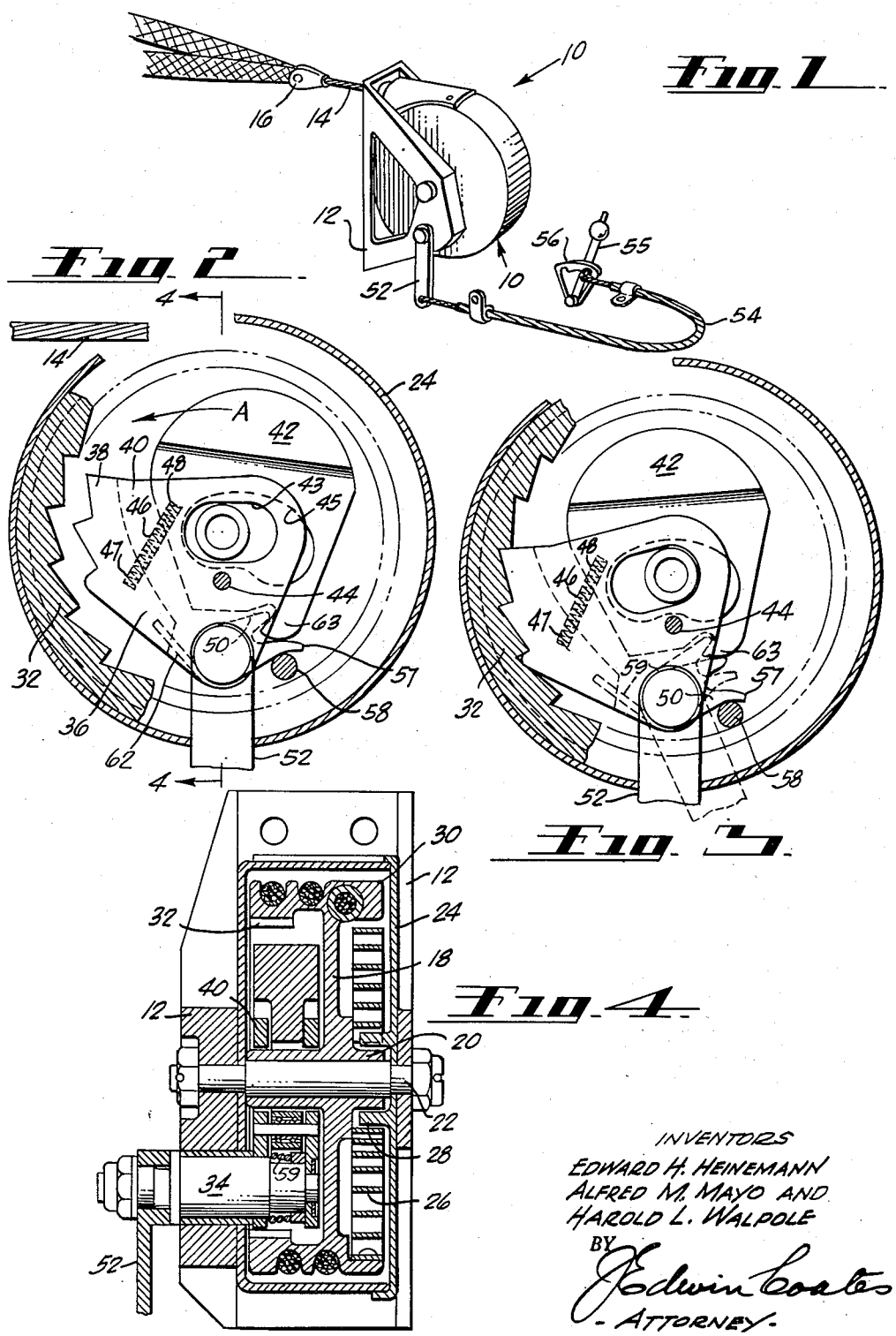

INVENTORS
EDWARD H. HEINEMANN
ALFRED M. MAYO AND
HAROLD L. WALPOLE
BY
J. Edwin Coates
ATTORNEY.

United States Patent Office 2,708,555
Patented May 17, 1955

2,708,555

INERTIA REEL

Edward H. Heinemann, Los Angeles, Alfred M. Mayo, Palos Verdes Estates, and Harold L. Walpole, Los Angeles, Calif., assignors to Douglas Aircraft Company, Inc., Santa Monica, Calif.

Application June 30, 1952, Serial No. 296,412

16 Claims. (Cl. 242—99)

This invention relates to automatically operable safety harness for preventing injury to occupants of fast moving vehicles in the event of a crash or a very rapid deceleration, and is particularly directed to a take-up and locking reel which will maintain the harness snugly against the user at all times and which will lock solidly and instantaneously in an emergency to prevent the user from being thrown forward against the structure of the vehicle.

Various devices have been proposed and used in the past for this purpose but have not been satisfactory, primarily because they have been complicated and cumbersome and have not been reliable enough in their operation to satisfy the requirements for an emergency device which must work every time it is needed if it is to be relied upon at all.

The present device has been reduced to the smallest number of parts possible without sacrificing utility and incorporates "fail-safe" features so that failure of small parts will permit or cause it to operate rather than prevent it from operating.

In general, in its preferred forms, the device includes a take up reel comprising a cable drum on which a cable is wound, with its free end attached to the pilot's safety harness, a spring to rotate the drum and reel in the cable and an inertia operated latch means adapted, upon rapid deceleration of the vehicle, to positively engage the drum and prevent any unreeling of the cable.

The drum is provided on its internal periphery with ratchet teeth and the latch mechanism is located within the confines of the drum to protect it from dirt and mechanical damage. The latch mechanism includes a pivoted pawl with one or more teeth engageable with one or more of the internal teeth of the drum to positively block its rotation. The inertia of the pawl and, in one form, its hold-back member will throw the pawl into engagement upon sudden stoppage or deceleration of the vehicle. Manually operated means are provided for releasing the pawl and returning it to inoperative position after use.

The small number of parts and their relative arrangement make the device simple, sure, and easy to operate and allows designing them with adequate strength without excessive weight, which is of vital importance in any mechanism which is primarily intended for use in aircraft.

Various other advantages and features of novelty will become apparent as the description proceeds. The presently preferred forms of the invention are illustrated in the accompanying drawings in which:

Figure 1 is a perspective view of the inertia reel of this invention and the pilot operated means for releasing the pawl from engaged position;

Figure 2 is an elevational view partly in section of an inertia reel showing the details of one form of the latch mechanism in unlocked, or non-engaging, position;

Figure 3 is a similar view showing the latch mechanism in locked position;

Figure 4 is a sectional view taken on line 4—4 of Figure 2;

Figure 5:
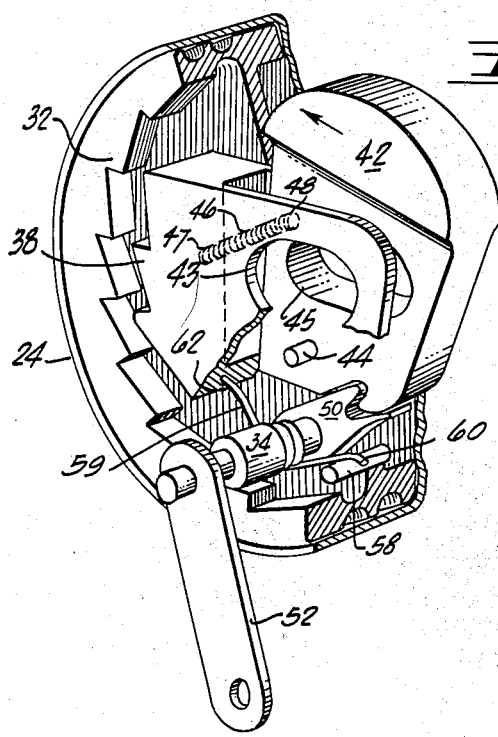
Figure 5 is a perspective view of the device of Figures 1 to 5 taken from the bell-crank side with portions broken away to illustrate details.
Figure 6:
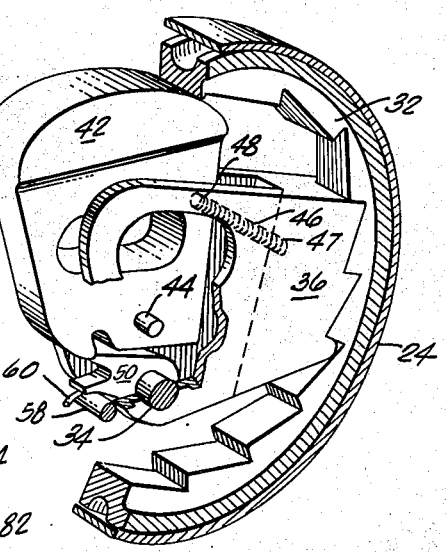
Figure 6 is a similar view taken from the opposite side.

Referring now to the drawings in detail, Figure 1 illustrates the general arrangement of an inertia reel 10, carried by bracket 12 which is normally attached to a strong, firm part of an airplane structure immediately back of a pilot's seat.

Cable 14 extends forwardly from the reel and terminates in fitting 16 to which a conventional safety harness may be attached by means of a clevis pin or the like.

As will be seen in Figures 2 and 4, the drum includes a web 18 having a hub 20 rotatably carried on cross shaft 22 which in turn is mounted in bracket 12. The drum is surrounded by casing 24 anchored to the bracket against rotation. The drum is constantly urged to a "reel-in" position by the torsion spring 26, the inner end of which is attached to the inwardly extending flange 28 of the casing and the outer end of which is attached to the flange 30 of the drum.

The inner periphery of the flange 30 at the opposite side of the web is provided with a plurality of ratchet teeth 32 engageable by the latch means about to be described. A stub shaft 34 is rotatable in the bracket 12 and passes through the wall of the casing. Pawl 36 is rotatably mounted on the stub shaft for swinging into and out of engagement with the drum and is provided with a plurality of teeth 38 adapted to enter into matching engagement with teeth 32. It is apparent from Figure 2 that when pawl 36 rotates counterclockwise about its axis which is displaced from the axis of the drum, the engagement of the teeth will make an absolute brake and that the greater the force applied by the drum the more positive the braking action will be.

The rearward portion of the pawl extending away from the toothed edge comprises a pair of spaced walls 40 between which is located a combined latch and inertia weight 42 carried on the pawl by a cross pin 44. The weight is urged rearwardly away from the pawl by spring 46 engaged at its ends in bores 47 and 48 in the pawl and weight respectively. Interference of the pawl and weight with shaft 22 is avoided by the provision of clearance holes 43 and 45.

The stub shaft 34 carries a detent member 50 fixed at its inner end and a crank arm 52 fixed at its outer end. The crank arm is operatively connected by a Bowden cable 54, Figure 1, to the pilot's control lever 55 carried by sector 56 provided with conventional two-position lock means. In the "unlocked" condition of the reel, the lever and crank arm hold the detent member 50 in the position of Figure 2, where boss 57 contacts stop 58. In the manually "locked" condition the crank arm and detent are in the position shown in Figure 3 in dotted lines and the pawl engages the drum. In the automatically locked condition the crank arm and detent are in the position shown in solid lines.

As best seen in Figure 5, a small grass-hopper spring 59 surrounds stub shaft 34 with its one free end 60 engaging stop 58 and its other free end 62 engaging the body of pawl 36. The spring normally urges the pawl forward, or counterclockwise as seen in Figure 5, toward engagement with the drum, and this force is resisted by the engagement of the catch portion 63 of weight 42 with detent member 50. The engagement surface of the catch portion 63 is normal to a line drawn from the axis of pin 44 to the point of engagement of catch portion 63 with detent member 50 to insure release when inertia forces are applied.

Upon sudden cessation or deceleration of movement to the left, as viewed in Figure 2, of the vehicle carrying the inertia reel the weight 42 will, because of its momentum, continue to travel in the direction of arrow A and will pivot counterclockwise about pin 44, thus releasing its catch portion 63 from detent 50. The force of spring 59 and the inertia of the weight will combine to throw the pawl forward, and its teeth will engage with a corresponding number of teeth on the drum. Because of the outward swinging movement of the pawl a very positive engagement is made, and greater rotative force on the drum increases the engaging force so that nothing short of complete breakage of the teeth can prevent proper locking action. Even if several teeth on the drum fail, the next ones coming along will engage the pawl, whether or not it is damaged, and the locking function will still be accomplished. If either or both of the springs should fail, the inertia effect will still produce the locking action when needed. The only disadvantage would be possible undesired locking as a result of vibration. It will therefore be seen that the device "fails safe" which is of utmost importance in aviation equipment.

In order to return the reel to the "unlocked" condition it is necessary for the pilot merely to shift the crank arm 52 to the dotted line position of Figure 3. The detent 50 will then pick up the catch 63 and return of the crank arm to the position of Figure 2 will unlock the reel and it will be ready for further use.

Figure 7:
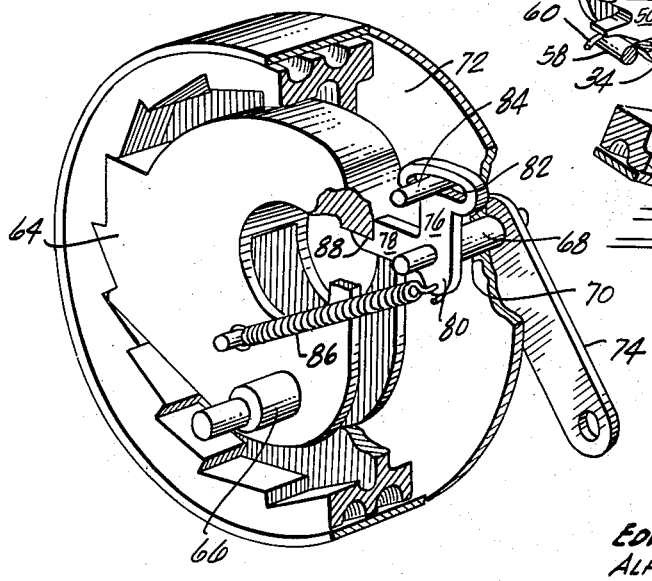
Figure 7 is a similar view illustrating a modified form of the invention.

The modification shown in Figure 7 incorporates most of the same parts as the one previously described. However, in this form the pawl 64, mounted on stub shaft 66 incorporates its own inertia weight. A rock shaft 68 is rotatably mounted in a flange boss 70 in the side wall of casing 72. An operating crank arm 74 is fixed to its outer end and is connected to the pilot's control in the same way as in the form previously described. A bell crank having an upwardly extending arm 76, a forwardly extending arm 78, and a downwardly extending arm 80, is fixed to the inner end of the rock shaft.

The upper end of arm 76 is enlarged and provided with a lost motion slot 82 for engagement with stop pin 84 to limit rotation of the bell crank. Spring 86, acting in tension, is attached at its ends to pawl 64 and arm 80 and serves to yieldingly hold the pawl out of engagement with the drum and to urge the bell crank to a latching position so that the toothed end 88 of arm 78 can engage the rear wall of the pawl as shown.

Normally, in unlocked condition the pawl is held away from the drum and arm 78 lies within the slot in the rear wall of the pawl. Upon sudden stoppage or deceleration the pawl is thrown forward by its own moment against the relatively slight restraining force of the spring into locking engagement with the drum. The tension of the spring then snaps the toothed end 88 of arm 78 into position behind the pawl, thus locking the latter in its engaged position. To release the pawl the pilot merely operates his control to rotate crank arm 74 counterclockwise as viewed in Figure 7. This disengages latch tooth 88, and the spring returns the pawl to its inoperative position.

It will be apparent that various changes and modifications in the construction and arrangement of parts may be made without departing from the spirit of the invention and it is intended that all such modifications and changes shall be embraced within the scope of the following claims.

We claim:

1. An inertia actuated device for preventing rotation of a member about its axis when its translational velocity is rapidly changed, comprising: an inwardly facing peripheral braking surface formed on said member and having an axis common with the axis of said member; brake means rotatably mounted on an axis that is parallel to and in fixed spaced relation to the axis of said member, said braking means being disposed within the periphery of said braking surface; inertia actuated latch means pivotally mounted on said brake means; resilient means interconnecting said latch means and said brake means; detent means for engaging said latch means to hold said brake means out of engagement with said braking surface; torque applying means constantly tending to force said rotatably mounted brake means into engagement with the periphery of said braking surface; said latch means being rotatable against the resistance of said resilient means by its own inertia to disengage itself from said detent means and release said brake means and permit said torque applying means to force said brake means into engagement with the periphery of said braking surface to thereby prevent further rotation of said member whenever its translational velocity is rapidly changed.

2. An inertia actuated device for preventing rotation of a member about its axis when its translational velocity is rapidly changed, comprising: an inwardly disposed peripheral brake surface containing a plurality of ratchet teeth formed on said member, said brake surface having an axis common with the axis of said member; a locking pawl rotatably mounted on an axis parallel to the axis of said member and adapted to interengage with said ratchet teeth; an inertia actuated latch pivotally mounted on said locking pawl; resilient means interconnecting said latch and said pawl; a detent adapted to engage said inertia latch to hold said pawl out of engagement with said ratchet teeth until a rapid change in the translational velocity of said member enables the inertia of said latch to force the latch against the resistance of said resilient means to thereby move out of engagement with said detent and release said pawl; a torque applying element constantly tending to force said rotatably mounted pawl into engagement with said ratchet teeth; said pawl axis being so located that the radial distance from said axis to the teeth engaging portion of said pawl is always greater than the shortest distance, measured on a line passing through the axis of said pawl and the axis of said member, between said pawl axis and said ratchet teeth in order that the torsional forces generated when said pawl contacts said teeth will cause them to positively interengage.

3. A device of the class described for yieldably connecting a safety element to a support whereby said element may normally be moved with respect to said support, comprising: normally unreleased restraining means pivotally mounted and operable by its own inertia when released to move into engagement with and restrain said safety element from yielding; release means normally preventing the operation of said restraining means, said release means being actuated by its own inertia when said support's velocity is rapidly changed to thereby release said pivotally mounted restraining means.

4. A safety device for restraining the movement of a body carried within a vehicle when the velocity of said vehicle is rapidly changed and normally yieldingly connecting a safety element to a vehicle mounted support whereby said element may be moved with respect to said vehicle, comprising: normally unreleased restraining means pivotally mounted and operable when released to restrain said safety element from yielding; release means mounted on and carried by the restraining means normally preventing the operation of said restraining means, said release means being actuated by its own inertia when said vehicle's velocity is rapidly changed to thereby release said pivotally mounted restraining means.

5. A device of the class described comprising: a vehicle attached take up reel mounted for rotation about an axis normal to the direction of travel of the vehicle and including a drum having a web and a peripheral flange; elongate tension means wound about the exterior of said flange; resilient means acting on said drum to retain said tension means wound thereon; and integral lock means mounted within said drum for movement in the direction of movement of said vehicle to engage the inner periphery of the flange and normally held out of engagement with said inner periphery of said flange; said lock means having a substantial mass sufficient to throw it into locking engagement with the inner periphery of said flange upon sudden deceleration of said vehicle.

6. A device as claimed in claim 5 in which said lock means is mounted for rotation about an axis parallel to the axis of rotation of said drum.

7. A device as claimed in claim 5 in which the inner periphery of said flange is provided with a plurality of teeth and said lock means is provided with a complementary tooth engaging portion.

8. A device as claimed in claim 5 in which the inner periphery of said flange is provided with a plurality of teeth and said lock means is provided with a complementary tooth engaging portion, said lock means being mounted for rotation about an axis parallel to the axis of rotation of said drum.

9. A device as claimed in claim 5, and latch means automatically engageable with said lock means upon movement of the latter into locking position and serving to positively restrain it against movement out of locking position.

10. A device of the class described, comprising: a take up reel rotatably mounted about a first axis; elongate flexible tension bearing safety means operably connected to said take up reel whereby a substantial length of said safety means may be unwound from said reel; inertia actuated braking means for preventing the rotation of said reel; ratchet teeth formed on a portion of said braking means and adapted to engage similar ratchet teeth formed on the inner periphery of said reel; said braking means being pivotally mounted on a second axis substantially parallel to the axis of said reel, the axis of said braking means being positioned in such a manner that the radial distance from said second axis to the ratchet teeth of said braking means is always greater than the shortest distance, measured on a line passing through said aforementioned two axes, between said braking means axis and the inner periphery of said reel in order that the torsional forces generated when said braking means is actuated by inertia will cause said teeth to positively engage.

11. A safety device for restraining the movement of a body carried within a vehicle when the velocity of said vehicle is rapidly changed, comprising: a take up reel adapted to be connected to said vehicle and to have an elongate flexible tension bearing safety means operably connected to said take up reel whereby a substantial length of said safety means may normally be withdrawn from said reel; brake means pivotally associated with the fixed portion of said take up reel; inertia actuated latch means pivotally mounted on said brake means; cocking cam means pivotally connected to the fixed portion of said take up reel and adapted to engage a portion of said inertia latch means whereby said latch means and said brake means may be rotated and held in a cocked position, said latch means serving by its own inertia to release said brake means whenever the velocity of said vehicle rapidly changes, thereby permitting said brake means to prevent further withdrawal of said safety means from said reel.

12. A safety device for restraining the movement of a body carried within a vehicle when the velocity of said vehicle is rapidly changed, comprising: a take up reel rotatably connected to a portion of said vehicle and adapted to take up an elongate flexible tension bearing safety means joining said body and said reel; brake means rotatably mounted on an axis parallel to the axis of said reel, said braking means axis being disposed within the inner periphery of said reel; inertia actuated latch means pivotally mounted on said brake means; resilient means interconnecting said latch means and said braking means; cam means for engaging said latch means to hold said brake means out of engagement with the inner periphery of said reel; torque applying means constantly tending to force said rotatably mounted brake means into engagement with the inner periphery of said reel; said latch means being rotated against the resistance of said resilient means by its own inertia to release said braking means and permit said torque applying means to force said braking means into engagement with the inner periphery of said reel to thereby prevent further unwinding movement of said safety means whenever the velocity of said vehicle is rapidly changed.

13. A safety device for restraining the movement of a body carried within a vehicle when the velocity of said vehicle is rapidly changed, comprising: a take up reel rotatably connected to a portion of said vehicle and adapted to have an elongate flexible tension bearing safety means joining said body and said reel unwound from said reel; a locking pawl rotatably mounted on an axis parallel to the axis of said reel and disposed within the inner periphery of said reel; ratchet teeth formed on the inner periphery of said reel and adapted to interengage with said locking pawl; an inertia actuated latch pivotally mounted on said locking pawl; resilient means interconnecting said latch and said pawl; a manually operable cam adapted to engage said inertia latch to hold said pawl out of engagement with said ratchet teeth until a rapid change in the velocity of said vehicle enables the inertia of said latch to force the latch against the resistance of said resilient means to thereby move out of engagement with said cam and release said pawl; a torque applying element constantly tending to force said rotatably mounted pawl into engagement with said ratchet teeth, the aforedescribed disposition of said reel axis and said pawl axis being such as to cause said pawl and said teeth to be forced into positive engagement by the torsional forces generated when said torque applying element has rotated said pawl to a position where it is contacted by said teeth to prevent further unwinding movement of said safety means.

14. A safety device for restraining the movement of a body carried within a vehicle when the velocity of said vehicle is rapidly changed, comprising: a take up reel adapted to be connected to said vehicle and adapted to have an elongate flexible tension bearing safety means operably connected to said take up reel whereby a substantial length of said safety means may normally be withdrawn from said reel; brake means pivotally associated with a fixed portion of said take up reel; inertia actuated latch means pivotally mounted on said brake means; resilient means interconnecting said latch means and said braking means; cocking cam means pivotally connected to the fixed portion of said take up reel; control means associated with said cam means for rotation of said cam means into camming engagement with a portion of said inertia latch means and for rotating said latch means and said brake means into their cocked position when so engaged; torque applying means constantly tending to force said rotatably mounted brake means into braking engagement, said control means overcoming said torque applying means when said cam means is engaged to place said brake means in its unlocked position, said control means additionally serving to release said torque means to thereby move said brake means into braking engagement at any time; said latch means serving by its own inertia to overcome the resistance of said resilient means and release said braking means from its cocked position and permit said torque applying means to force said braking means into braking engagement without actuation of said control means whenever the velocity of said vehicle is rapidly changed.

15. An aircraft safety device for restraining the movement of a body in a pilot seat subject to rapid decelerating action, comprising: a resiliently tensioned cable take up reel operatively associated with said pilot seat to take up the slack in a body retaining harness and tend to retain said body in said seat against forward movement with respect to said seat upon decelerating movement of said seat; one way brake means pivotally associated with the fixed portion of said take up reel; inertia actuated latch means pivotally associated with said brake means; resilient means interconnecting said latch means and said brake means; cocking cam means pivotally connected to the fixed portion of said take up reel; manually operable control means associated with said cam means for rotation of said cam means into camming engagement with a portion of said inertia latch means and for rotating said latch means and said brake means into their cocked position when so engaged; torque applying means constantly tending to force said rotatably mounted brake means into braking engagement with the rotatable portion of said reel to lock said cable means against further movement, said control means serving to overcome said torque applying means when said cam is engaged to thereby place said brake means in its disengaged position, said control means additionally serving to release said torque means to thereby move said brake means into braking engagement at any time; said latch means serving by its own deceleration created inertia to overcome the resistance of said resilient means and release said braking means from its cocked position to permit said torque applying means to force said braking means into braking engagement without actuation of said manually operable control means whenever said seat is subjected to rapid deceleration.

16. A device of the class described, comprising: yieldable means operatively connecting a support and a safety element whereby said element may normally be moved with respect to said support; normally disengaged latch means pivotally mounted on said support and adapted to be thrown into engagement with said yieldable means by its own inertia when its velocity is rapidly changed; restraining means connected to said latch means and serving to retain the latter in its disengaged position except when overcome by the inertia of said latch means; and stay-lock means actuated by the inertia generated movement of said latch means to automatically lock said latch means in its engaged position.

References Cited in the file of this patent

UNITED STATES PATENTS

| | | |
|---|---|---|
| 1,357,670 | Adams | Nov. 2, 1920 |
| 1,566,594 | Graham | Dec. 22, 1925 |
| 2,200,779 | Polikoff, et al. | May 14, 1940 |
| 2,394,523 | Pancoe | Feb. 5, 1946 |
| 2,403,653 | Geohegan, et al. | July 9, 1946 |
| 2,476,751 | McClellan | July 19, 1949 |
| 2,480,335 | Nordmark | Aug. 30, 1949 |
| 2,557,313 | Quilter | June 19, 1951 |
| 2,650,655 | Neabr et al. | Sept. 1, 1953 |